(12) United States Patent
Ma et al.

(10) Patent No.: US 11,609,399 B2
(45) Date of Patent: Mar. 21, 2023

(54) OPTICAL FIBER SPLICING TRAY

(71) Applicant: ZTE Corporation, Shenzhen (CN)

(72) Inventors: Aiping Ma, Shenzhen (CN); Yunpeng Xie, Shenzhen (CN); Zhao Lin, Shenzhen (CN); Fenglun Zhou, Shenzhen (CN); Fengyun Cao, Shenzhen (GD); Zhimin He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/279,367

(22) PCT Filed: Sep. 25, 2019

(86) PCT No.: PCT/CN2019/107789
§ 371 (c)(1),
(2) Date: Mar. 24, 2021

(87) PCT Pub. No.: WO2020/063662
PCT Pub. Date: Apr. 2, 2020

(65) Prior Publication Data
US 2021/0396944 A1    Dec. 23, 2021

(30) Foreign Application Priority Data

Sep. 25, 2018   (CN) .......................... 201821577775.5

(51) Int. Cl.
*G02B 6/44* (2006.01)
*G02B 6/255* (2006.01)
*G02B 6/42* (2006.01)

(52) U.S. Cl.
CPC ......... *G02B 6/4454* (2013.01); *G02B 6/4452* (2013.01); *G02B 6/4482* (2013.01);
(Continued)

(58) Field of Classification Search
CPC .. G02B 6/2551; G02B 6/4224; G02B 6/4442; G02B 6/4452; G02B 6/4454; G02B 6/4455; G02B 6/4482
See application file for complete search history.

(56) References Cited

U.S. PATENT DOCUMENTS 5,553,183 A   9/1996  Bechamps
5,806,140 A   9/1998  Carlson et al.
(Continued)

FOREIGN PATENT DOCUMENTS

CN   201083852 Y   7/2008
CN   202093215 U   12/2011
(Continued)

OTHER PUBLICATIONS

European Patent Offce. Extended European Search Report for EP Application No. 19867999.5, dated Sep. 24, 2021, pp. 1-7.
(Continued)

*Primary Examiner* — Ryan A Lepisto
(74) *Attorney, Agent, or Firm* — Vivacqua Crane, PLLC

(57) ABSTRACT

An optical fiber splicing tray is disclosed. The optical fiber splicing tray may include: an optical fiber splicing tray body; and a marker detachably connected to the optical fiber splicing tray body, where the marker is arranged at a position facilitating observation and identification of the marker when a plurality of optical fiber splicing trays are stacked.

16 Claims, 4 Drawing Sheets

(52) U.S. Cl.
CPC .......... *G02B 6/2551* (2013.01); *G02B 6/4224* (2013.01); *G02B 6/4455* (2013.01)

(56) References Cited

U.S. PATENT DOCUMENTS

| | | | | |
|---|---|---|---|---|
| 9,071,890 B2* | 6/2015 | Ruiz | ........................ | H04Q 1/02 |
| 9,128,262 B2* | 9/2015 | Campbell | ............ | G02B 6/4453 |
| 9,470,868 B2* | 10/2016 | Ellison | ................ | G02B 6/4454 |
| 9,690,065 B2* | 6/2017 | Wiltjer | ................ | G02B 6/4455 |
| 9,971,105 B2* | 5/2018 | Shi | ........................ | H05K 3/284 |
| 10,830,976 B2* | 11/2020 | Zhong | ................. | G02B 6/4454 |
| 2011/0013875 A1* | 1/2011 | Bran de Leon | ........ | G02B 6/445 |
| | | | | 385/135 |
| 2013/0205579 A1* | 8/2013 | Mather | ................ | H05K 5/0286 |
| | | | | 361/679.31 |
| 2018/0372978 A1* | 12/2018 | Wentworth | .......... | G02B 6/4455 |

FOREIGN PATENT DOCUMENTS

| | | |
|---|---|---|
| CN | 103535048 A | 1/2014 |
| CN | 204926134 U | 12/2015 |
| CN | 206930811 U | 1/2018 |
| EP | 2381283 B2 | 1/2017 |

OTHER PUBLICATIONS

International Search Report and Written Opinion for the International Patent Application No. PCT/CN2019/107789 dated Dec. 11, 2019.

* cited by examiner

OPTICAL FIBER SPLICING TRAY

CROSS-REFERENCE TO RELATED APPLICATION

This application is a national stage filing under 35 U.S.C. § 371 of international application number PCT/CN2019/107789, filed Sep. 25, 2019, which claims priority to Chinese patent application No. 201821577775.5, filed Sep. 25, 2018. The contents of these applications are incorporated herein by reference in their entirety.

TECHNICAL FIELD

The present disclosure relates to the field of communication devices, in particular to an optical fiber splicing tray of which the identity can be visually, accurately and stably identified.

BACKGROUND

For massive connection and wiring on optical fiber channels, although there are agreed chromatographic identification rules for fiber cores and fiber core sleeves, the colors are used cyclically, and they are not intuitive to guide optical cables of plenty of cores. This situation is called a "dumb" state in the industry, thus there is a requirement of an intuitive, accurate and stable way to identify their identities.

In some cases, color trays are usually used to satisfy this demand, that is, trays of specific colors are used to characterize specific service/function areas. For example, the trays are divided into optical splitter trays, spare core trays, rental service core storage trays, etc. Yellow trays, blue trays, red trays, etc., may be selected to represent the above meanings, and the trays are installed in partitions according to functions. In actual network construction and application, since there are great variables in network planning and actual development, the number of spare core trays needs to be reduced, while the number of rental service core storage trays needs to be increased. Usually, this function can only be realized by replacing a tray of a target color. Replacing the tray leads to a waste of resources and an increase in cost. Meanwhile, the tray is made of a non-metallic material, which causes a certain pressure on the natural environment.

At present, another implementation technology is to paste a self-adhesive tag of a corresponding marker color on the tray. The tag can be pasted on site according to the actual use of the tray. Although the problem that the tray needs to be replaced because the pre-planned color tray plan is inconsistent with the actual plan is solved, in a high-density application, the tray thickness is less than 4 mm, and a color tag with a width of not more than 4 mm needs to be pasted on a surface with a width of not more than 4 mm on site, which is difficult in actual implementation and poor in paste consistency and aesthetics. In addition, because optical cable joint boxes are used in manhole wells, outdoor cabinets and other environments, the humidity in the outdoor environment may be relatively high, dust cannot be controlled or eliminated, and optical cables may come with grease, etc. Even if alcohol wiping and other means are implemented, it is difficult to ensure that the adhesion surface between the tag and the tray meets the ideal and theoretical adhesion surface smoothness requirements. This practical difficulty may affect the adhesion of the tag, and then cause the tag to fall off, losing a reliable marking function. In addition, outdoor products cannot avoid high and low temperatures, causing a great challenge to the service life of the tag.

At present, another implementation technology is to provide a large tag near the tray. Partitions of the tray are reflected on the tag. There is a mapping relationship between the tray and the tag, and the actual function of the tray is marked on the tag after the actual application function is completed. However, due to the simple mapping relationship between the tray and the tag, there is a need for a reader of the tag to perform reasoning between the tray and the tag by way of "telling what happen from a picture", which has poor intuitive guidance.

SUMMARY

In view of this, a purpose of the embodiments of the present disclosure is to provide an optical fiber splicing tray of which the identity can be visually, accurately and stably identified, so as to solve a technical problem that the guidance for an optical cable of plenty of cores is not intuitive because the colors for distinguishing fiber cores and the fiber core sleeves are used cyclically.

In accordance with an aspect of the present disclosure, an embodiment provides an optical fiber splicing tray, which may include: an optical fiber splicing tray body; and a marker detachably connected to the optical fiber splicing tray body, where the marker is arranged at a position facilitating observation and identification of the marker when a plurality of optical fiber splicing trays are stacked.

The realization of the purposes, functional features and advantages of the present disclosure will be further described in conjunction with the embodiments and with reference to the accompanying drawings.

DETAILED DESCRIPTION

In order to make the technical problems to be solved, technical schemes, and beneficial effects of the present disclosure clear and comprehensible, the present disclosure will be described in detail below with reference to the accompanying drawings and embodiments. It should be understood that the embodiments described herein are only used to explain the present disclosure, and are not used to limit the present disclosure.

Referring to FIG. 1 to FIG. 4, an embodiment of the present disclosure provides an optical fiber splicing tray that facilitates classification management, including: an optical fiber splicing tray body 100 and a marker 200 detachably connected to the optical fiber splicing tray body 100. The marker 200 is arranged at a position where the marker 200 can be easily observed when a plurality of optical fiber splicing tray bodies 100 are stacked. The splicing in the context of the present disclosure may include mechanical splicing and fusion splicing of optical fibers. In some embodiments, the optical fiber splicing tray is applicable for accommodating spliced optical fibers, optical fibers to be spliced or optical fibers being spliced.

According to the embodiment of the present disclosure, by arranging the marker 200 on the optical fiber splicing tray body 100, partitioning and functioning management according to the identification of the marker 200 can be realized. Meanwhile, when a service needs to be changed, a partitioning for the service change can be carried out by quickly detaching and replacing the marker, instead of replacing the whole tray, thus preventing from resource waste and environmental pollution due to the fact that in some cases the whole tray needs to be replaced for a service change through partitioning by different colors of trays. In the following embodiments, two insertion methods are illustrated for detachable connection. In practical applications, it is not limited to this detachable connection method. Detachable connection methods, for example, using strong magnets and hook and loop, which can be fastened quickly, are also within the protection scope of the present disclosure.

The present disclosure will be explained with embodiments below.

Referring to FIG. 1 to FIG. 5, an embodiment according to the present disclosure provides an optical fiber splicing tray that facilitates classification management, which includes: an optical fiber splicing tray body 100 and a marker 200, The marker 200 is arranged at a position where the marker 200 can be identified and conveniently detected when a plurality of optical fiber splicing trays are stacked.

Figure 2:
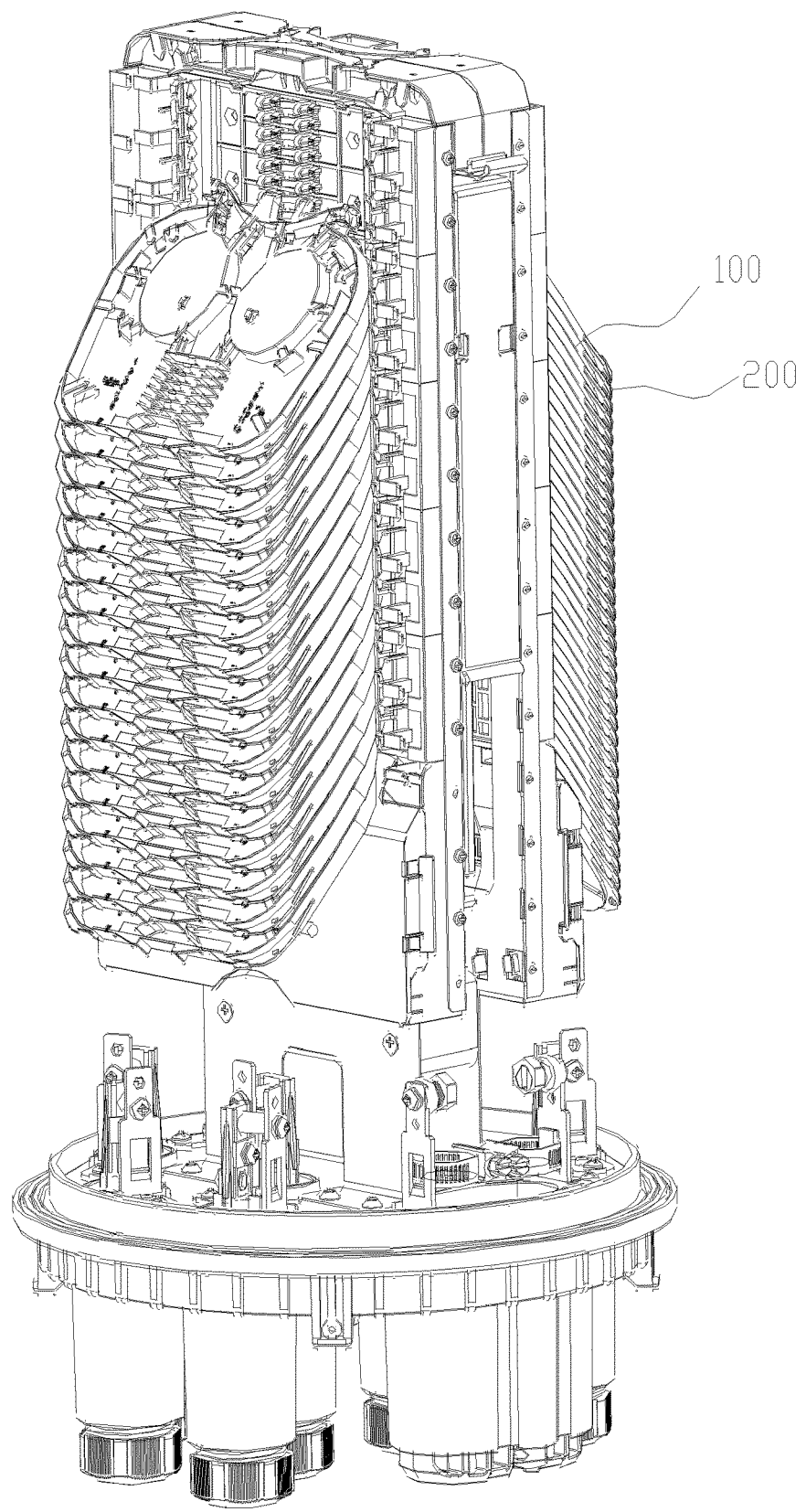
FIG. 2 is a structural schematic diagram of an embodiment of the present disclosure applied to an optical cable terminal box.

FIG. 2 is a schematic diagram of an optical cable joint box provided by an embodiment of the present disclosure. The optical cable joint box includes a plurality of optical fiber splicing trays stacked on top of one another in an orderly manner. One end (called a fixed end) of each optical fiber splicing tray is movably connected to a fixed back frame, and the other end (called a non-fixed end) of each optical fiber splicing tray can rotate and flip up and down relative to the fixed end for optical fiber installation, optical path maintenance, or removal/plugging of markers.

In practical applications, optical fiber splicing trays may be stacked in large numbers at high density. As shown in FIG. 2, when there is a need for classification management and adjustment of the optical fiber splicing trays, it is easier to detach/plug the marker 200 outside a frame at the non-fixed end of the optical fiber splicing tray body 100. Therefore, in the following embodiments of the present disclosure, the marker 200 is set outside an outer frame at the non-fixed end of the optical fiber splicing tray body 100 when the optical fiber splicing trays are stacked. Of course, any setting of the marker is within the protection scope of the present disclosure, as long as it meets the requirement that the marker can be easily identified and conveniently detected when a plurality of optical fiber splicing trays are stacked and applied in the optical cable joint box.

Figure 1:
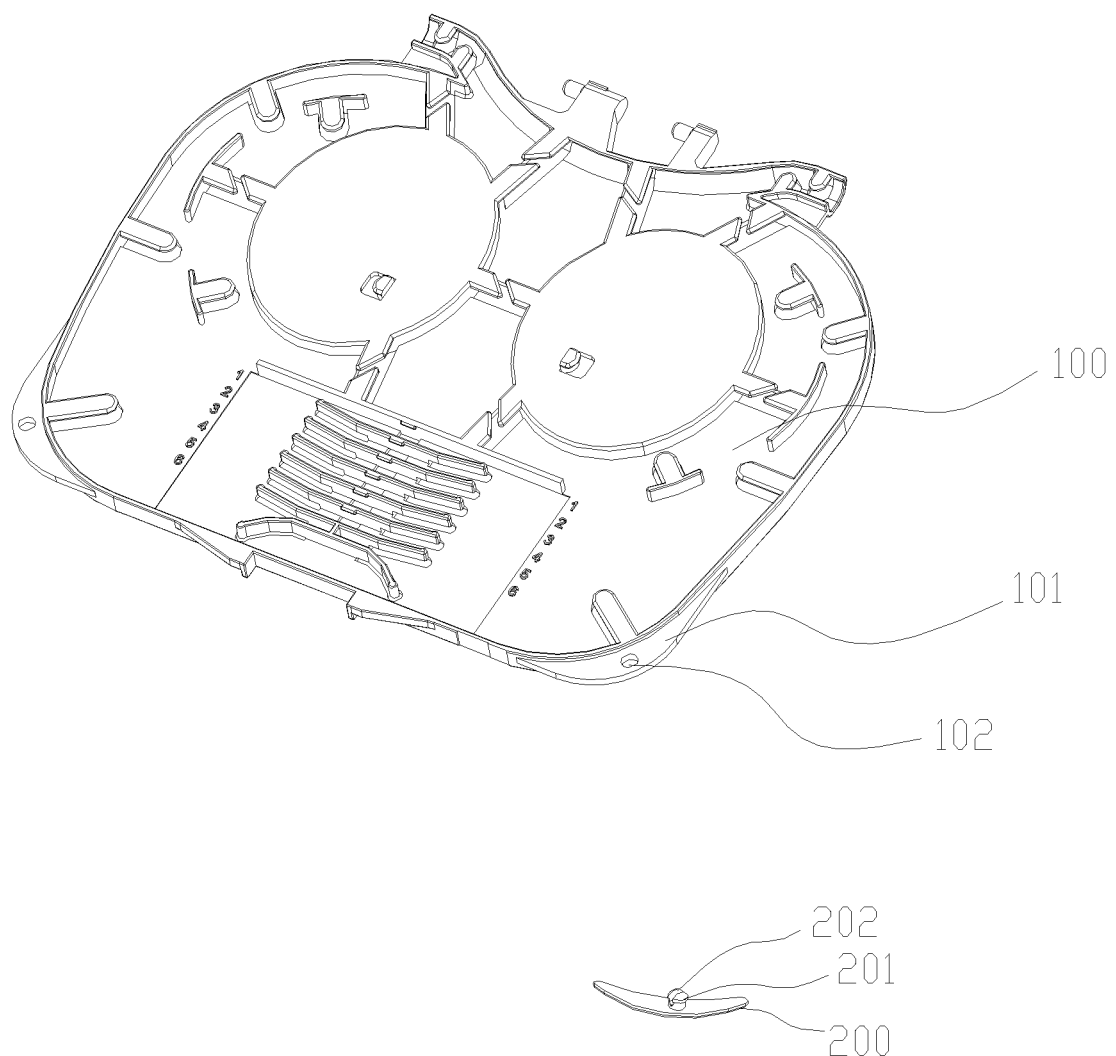
FIG. 1 is an exploded structural schematic diagram of an optical fiber splicing tray according to an embodiment of the present disclosure.

According to an embodiment of the present disclosure, as shown in FIG. 1, the optical fiber fusion splicing tray body 100 includes an outer frame on a surface of the optical fiber fusion splicing tray body 100, the outer frame includes a protrusion 101 arranged on the outer frame, and the marker 200 is capable of fitting with the protrusion 101. In some embodiments, the protrusion 101 may be a lug, for example, a lug in step-shaped. In some embodiments, the protrusion 101 of the optical fiber fusion splicing tray body 100 is arranged on a side of the outer frame away from the surface of the optical fiber fusion splicing tray body 100. The marker 200 fits well into the protrusion 101, and is set to be removably plugged in the protrusion 101. Here, the marker 200 fitting well into the protrusion 101 means that the stacking of a plurality of optical fiber splicing tray bodies 100 may not be affected after the marker 200 is fitted into the protrusion 101. Meanwhile, after being stacked, the optical fiber splicing tray bodies 100 provided with different markers 200 can be visually distinguished. With such mechanical connection structure, the optical fiber splicing trays are visually distinguished, and the markers 200 on the optical fiber splicing tray bodies 100 are effectively prevented from falling off during use.

In some embodiments, the protrusion 101 has a thickness less than the overall thickness of the optical fiber splicing tray body 100. Generally, the height of the outer frame of the optical fiber splicing tray body represents the overall thickness of the optical fiber splicing tray body 100. In this way, when the marker 200 fits well into the protrusion 101, the thickness of the optical fiber splicing tray body 100 with the inserted marker 200 is still not higher than or slightly equal to the overall thickness of the optical fiber splicing tray body 100. Thus, when a plurality of optical fiber splicing tray bodies 100 provided with markers are stacked, the stacking will not be affected by the arrangement of the markers.

In an implementation, a buckle hole 102 is provided at a position of the protrusion 101 of the optical fiber splicing tray body 100, and one side of the marker 200 is provided with a buckle 201 matched and buckled into the buckle hole 102. In the embodiment shown in FIG. 1, the buckle hole 102 is arranged in the protrusion 101. It is understood that the buckle hole 102 can also be arranged at the side of the protrusion 101 and other positions as long as the marker 200 is provided with a buckle 201 which is matched and inserted into the buckle hole 102, these are all contained within the protection scope of the present disclosure.

In an implementation, the optical fiber fusion splicing tray body 100 includes a fixed end configured for installation of the optical fiber fusion splicing tray, for example, to an optical cable joint box, and a non-fixed end opposite to the fixed end, the outer frame includes two corners at the non-fixed end, each of the two corners are respectively provided with the protrusion 101, into which the marker 200 is removably plugged.

In an implementation, the buckle 201 includes an enlarged head having a tightening section. The tightening section is provided with an axial open groove 202, so that the marker 200 is not easy to fall off after being inserted into the optical fiber splicing tray body 100, and the marker 200 can be conveniently pulled out with force and replaced.

In an implementation, the marker 200 is configured to have one or a combination of a different color, a different letter, a different number and a different pattern, corresponding to the optical fiber splicing tray body 100, so that an optical fiber splicing tray buckled and inserted with the marker 200 can be visually identified.

In an implementation, the marker 200 is provided with a Radio Frequency Identification (RFID) tag. Therefore, information stored in the RFID tag can be read by an electronic terminal (such as a smart phone) with an RFID reading function to identify the optical fiber splicing tray.

Figure 3:
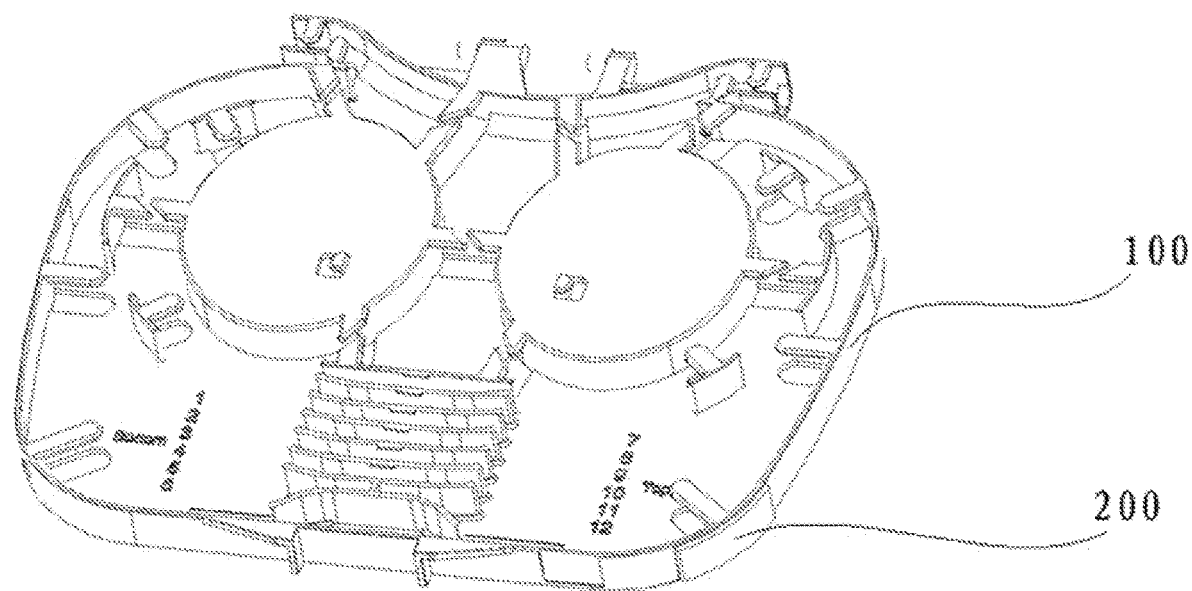
FIG. 3 is a structural schematic diagram of another optical fiber splicing tray provided by an embodiment of the present disclosure.
Figure 4:
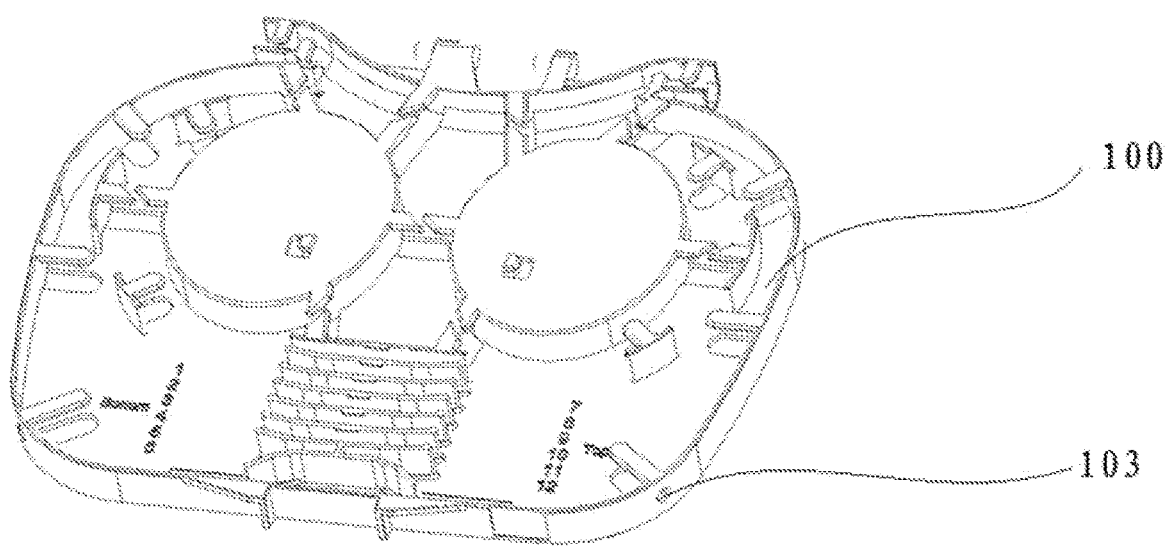
FIG. 4 is a structural schematic diagram of another optical fiber splicing tray body provided by an embodiment of the present disclosure.
Figure 5:
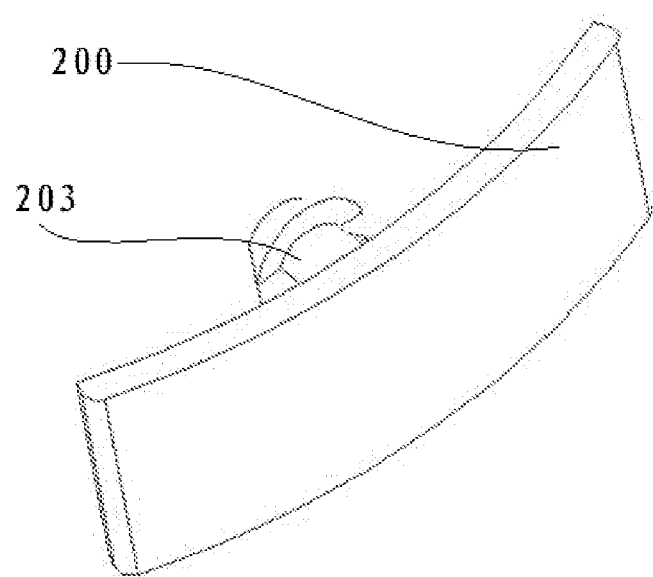
FIG. 5 is a structural schematic diagram of another optical fiber splicing tray marker provided by an embodiment of the present disclosure.

Referring to FIG. 3 to FIG. 4, another embodiment according to the present disclosure provides an optical fiber splicing tray that facilitates classification management. The embodiment of the present disclosure is an improvement made based on the existing optical fiber splicing tray, where an opening or slot is provided to match a marker at an easy-to-observe position of the outer frame of the existing optical fiber splicing tray.

According to an embodiment of the present disclosure, as shown in FIG. 3, the optical fiber splicing tray includes an optical fiber splicing tray body 100 and a marker 200. The optical fiber splicing tray body 100 is provided with a buckle hole 103 at a side edge of the tray body 100, and a buckle 203 matched and buckled into the buckle hole 103 is provided on a side of the marker 200. Similarly, the buckle 203 also includes an enlarged head having a tightening section which is provided with an axial open groove. In some embodiments, the side edge is or being a part of the outer frame. In some embodiments, two corners of the side edge of the optical fiber splicing tray body 100 are respectively provided with a buckle hole 103, and two markers 200 are removably plugged at the two corner edges of the unfixed end of the optical fiber splicing tray body 100, so that different optical fiber splicing trays may be visually identified on different corners or side faces. In some embodiments, the optical fiber fusion splicing tray body 101 includes a fixed end configured for installation of the optical fiber fusion splicing tray and a non-fixed end opposite to the fixed end, the marker 200 is removably plugged at each of two corners of the optical fiber fusion splicing tray body at the non-fixed end.

The structure and position of the marker in the optical fiber splicing tray of the present disclosure are set such that the marker 200 can be conveniently observed and detached when a plurality of optical fiber splicing trays are stacked, and when the plurality of optical fiber splicing trays are stacked and applied in the optical cable joint box, the stacking is not affected because of the marker, where affecting issues include, for example, the stacking thickness being unnecessarily increased, affecting the number of optical fiber splicing trays that can be stacked in the optical cable joint box.

For the optical fiber splicing tray provided by embodiments of the present disclosure, the identity of the optical fiber splicing tray can be visually, accurately and stably identified.

According to the embodiments of the present disclosure, by arranging the marker on the optical fiber splicing tray body, partitioning and functioning management according to the identification of the marker 200 can be realized. Meanwhile, when a service needs to be changed, a partitioning for the service change can be carried out by quickly detaching and replacing the marker, instead of replacing the whole tray, thus preventing from resource waste and environmental pollution due to the fact that in some cases the whole tray needs to be replaced for a service change through partitioning by different colors of trays.

Several embodiments of the present disclosure are described above with reference to the drawings, and are not intended to limit the scope of the present disclosure. Any modification, equivalent replacement, and improvement made by those having ordinary skills in the art without departing from the scope and essence of the present disclosure shall be contained within the scope of the present disclosure.

The invention claimed is:

1. An optical fiber splicing tray, comprising:
an optical fiber splicing tray body; and
a marker, detachably connected to the optical fiber splicing tray body, wherein the marker is arranged at a position facilitating observation and identification of the marker when a plurality of optical fiber splicing trays are stacked;
wherein the optical fiber splicing tray body comprises an outer frame on a surface of the optical fiber splicing tray body, the outer frame comprises a protrusion arranged on the outer frame, and the marker is capable of fitting with the protrusion, wherein the marker is configured to be removably plugged in the protrusion; and
the optical fiber splicing tray body comprises a fixed end configured for installation of the optical fiber splicing tray and a non-fixed end opposite to the fixed end, the outer frame comprises two corners at the non-fixed end, each of the two corners is provided with the protrusion, into which the marker is removably plugged.

2. The optical fiber splicing tray of claim 1, wherein a buckle hole is provided in the protrusion of the optical fiber splicing tray body, and a side of the marker is provided with a buckle matched and buckled into the buckle hole.

3. The optical fiber splicing tray of claim 2, wherein the buckle of the marker comprises an enlarged head having a tightening section, the tightening section is provided with an axial open groove.

4. The optical fiber splicing tray of claim 1, wherein the marker is removably plugged at a side edge of the optical fiber splicing tray.

5. The optical fiber splicing tray of claim 4, wherein the optical fiber splicing tray is provided with a buckle hole at the side edge, and the marker is provided with a buckle matched and buckled into the buckle hole.

6. The optical fiber splicing tray of claim 5, wherein the buckle of the marker comprises an enlarged head having a tightening section, the tightening section is provided with an axial open groove.

7. The optical fiber splicing tray of claim 1, wherein the marker is configured to have one or a combination of a different color, a different letter, a different number, and a different pattern corresponding to the optic fiber splicing tray body.

8. The optical fiber splicing tray of claim 1, wherein the marker is provided with a Radio Frequency Identification (RFID) tag.

9. The optical fiber splicing tray of claim 1, wherein the protrusion of the optical fiber splicing tray body comprises a lug.

10. An optical fiber splicing tray, comprising:
an optical fiber splicing tray body; and
a marker, detachably connected to the optical fiber splicing tray body, wherein the marker is arranged at a position facilitating observation and identification of the marker when a plurality of optical fiber splicing trays are stacked;
wherein the optical fiber splicing tray body comprises an outer frame on a surface of the optical fiber splicing tray body, the outer frame comprises a protrusion arranged on the outer frame, and the marker is capable of fitting with the protrusion; and
the optical fiber splicing tray body comprises a fixed end configured for installation of the optical fiber splicing tray and a non-fixed end opposite to the fixed end, the outer frame comprises two corners at the non-fixed end, at least one of the two corners is provided with the protrusion, the marker is removably plugged into the protrusion at one of the two corners.

11. The optical fiber splicing tray of claim 10, wherein a buckle hole is provided in the protrusion of the optical fiber splicing tray body, and a side of the marker is provided with a buckle matched and buckled into the buckle hole.

12. The optical fiber splicing tray of claim 11, wherein the buckle of the marker comprises an enlarged head having a tightening section, the tightening section is provided with an axial open groove.

13. The optical fiber splicing tray of claim 10, wherein the marker is configured to have one or a combination of a different color, a different letter, a different number, and a different pattern corresponding to the optic fiber splicing tray body.

14. The optical fiber splicing tray of claim 10, wherein the marker is provided with a Radio Frequency Identification (RFID) tag.

15. The optical fiber splicing tray of claim 10, wherein the protrusion of the optical fiber splicing tray body comprises a lug.

16. An optical fiber splicing tray, comprising:
an optical fiber splicing tray body; and
a marker, detachably connected to the optical fiber splicing tray body,
wherein the marker is arranged at a position facilitating observation and identification of the marker when a plurality of optical fiber splicing trays are stacked; and
wherein the optical fiber splicing tray body comprises a fixed end configured for installation of the optical fiber splicing tray and a non-fixed end opposite to the fixed end, the marker is removably plugged at one or each of two corners of the optical fiber splicing tray body at the non-fixed end.

* * * * *